Dec. 29, 1959 O. C. WINZEN ET AL 2,919,082

BALLOON HAVING REINFORCING STRUCTURE

Filed June 20, 1955 4 Sheets-Sheet 1

INVENTORS
OTTO C. WINZEN
VERA H. WINZEN
BY
Paul, Moore & Hugger
ATTORNEYS

Dec. 29, 1959 O. C. WINZEN ET AL 2,919,082

BALLOON HAVING REINFORCING STRUCTURE

Filed June 20, 1955 4 Sheets-Sheet 2

INVENTORS
OTTO C. WINZEN
BY VERA H. WINZEN
Paul, Moore & Nygger
ATTORNEYS

INVENTORS
OTTO C. WINZEN
BY VERA H. WINZEN
Paul, Moore & Dugger
ATTORNEYS

INVENTORS
OTTO C. WINZEN
BY VERA H. WINZEN
Paul Moore & Dugger
ATTORNEYS

United States Patent Office 2,919,082

Patented Dec. 29, 1959

2,919,082

BALLOON HAVING REINFORCING STRUCTURE

Otto C. Winzen and Vera H. Winzen, Mendota Township, Dakota County, Minn., assignors to Winzen Research, Inc., Minneapolis, Minn., a corporation of Minnesota Application June 20, 1955, Serial No. 516,436

9 Claims. (Cl. 244—31)

The present invention refers to improvements in balloon structure having novel reinforcing means.

Specifically it relates to a balloon envelope, inflatable to a normal datum configuration and having a plurality of relatively non-extensible reinforcing tapes providing a reduced confine for a part of the envelope. In such reduced confine the tapes are shortened so as to have an extension slightly less than the normal or datum extension of that portion of the periphery of the inflated balloon over which they are superimposed so as to provide an inward distortion of the balloon envelope. This permits the utilization of higher gas pressures with lighter envelope films and relieves the stress upon the film. In addition, these tapes may also be used to provide means for supporting a load from the envelope, anchor means for the envelope, etc. Usually the invention contemplates an envelope having an appendix end and an apex end, the envelope comprising a plurality of gores extending in a direction from the apex end to the appendix end, adjacent gores being joined together to form the envelope and the reinforcing tapes being at least in the main situated one over each of the adjacent gore junctures.

It is therefore an object of this invention to provide a new and useful balloon envelope in which higher gas pressures and lighter envelope films may be used;

It is a further object of this invention to provide a new and useful reinforcing confine structure for balloon envelopes;

A further object of this invention resides in the provision of an inextensible tape structure for a balloon envelope in which the tapes are shortened adjacent one end of the envelope to relieve stress on the envelope;

Another object of this invention is to provide a new and useful apex construction for a balloon envelope;

Still another object of this invention is to provide a new and useful appendix construction for a balloon envelope;

Other objects of the invention reside in the construction of the reinforcing structure utilized for providing the reduced confine; and Still further objects of the invention are those inherent and apparent in the apparatus as described, pictured and claimed.

To the accomplishment of the foregoing and related ends, this invention then comprises the features hereinafter fully described and particularly pointed out in the claims, the following description setting forth in detail certain illustrative embodiments of the invention, these being indicative, however, of but a few of the various ways in which the principles of the invention may be employed.

The invention is illustrated in the drawings attached hereto the views being designated as follows.

Figure 1:
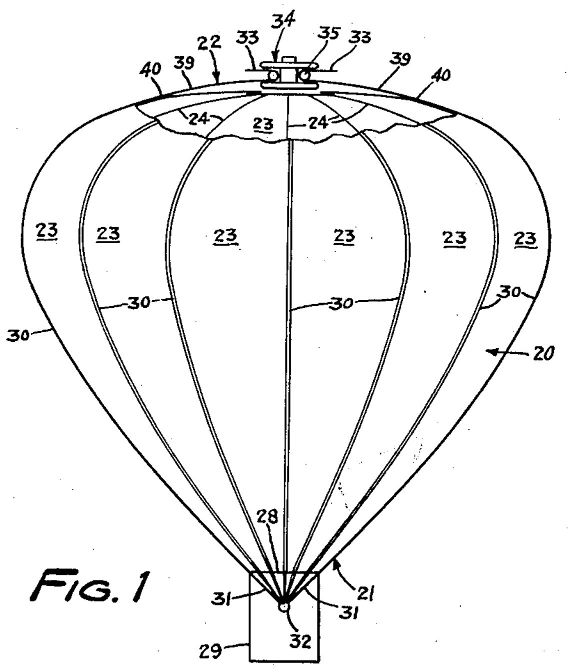
Figure 1 is an elevational view, partly broken away, of a balloon embodying the present invention and showing an apex clamp in greatly enlarged dimension.

The balloon embodying this invention is shown in Figure 1 and comprises an envelope 20 having an appendix end 21 and an apex end 22, which comprise the terminal portions of the balloon.

Throughout the specification the terms "apex end" and "appendix end" will be used to designate the terminal portions of the balloon. The term "apex end" is to be understood as meaning that portion of the balloon which is designed to be or normally is the leading end of the balloon in flight or ascension and the "appendix end" is designed to be or normally is the trailing end of the balloon in flight or ascension. While historically the apex end of the balloon has been closed and the appendix end of the balloon has been the place at which inflation occurs, these terms will not be so limited throughout this application, for this invention is intended to be utilized with balloons which are inflated at their appendix, at their apex, or otherwise.

Also historically, the terminal portion of a balloon designated as the apex end is somewhat rounded and the terminal portion of the balloon designated as the appendix end is tapered since the conventional balloon is a spheroid and resembles substantially the shape of a light bulb; but this invention is not limited to those configurations of balloon and balloons of other configuration, such as spherical, cigar shape, etc., may be used, within the spirit and scope of this invention.

Figure 7:
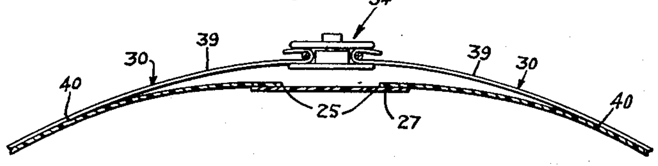
Figure 7 is a fragmentary vertical sectional view through the apex end of the balloon.

The envelope in this instance comprises a plurality of gores extending generally in a direction from the apex to the appendix end of the balloon. Each of the gores 23 is joined to adjacent gores along its edges to form junctures 24. At the apex end the gores usually terminate at 25 as shown in Figure 7 and are secured to a circular apex cap 27, likewise as shown in that figure, preferably by heat-sealing, or by other means.

At the appendix end the gores terminate at 28 as shown in Figure 1 and a flexible tubular skirt 29 is joined at one end thereto.

Over each one of the junctures 24 and on the exterior of the envelope is positioned a substantially non-extensible reinforcing tape 30. As shown in Figure 1, the tape extends from the apex end 22 of the balloon to the appendix end 21 and has a portion 31 extending beyond the terminal end 28 of the gores and interior of the skirt 29 to a load supporting ring 32. At the apex end of the balloon the tape 30 is provided with a doubled back end 33 forming a loop around an O-ring 35 of clamp 34.

The loops formed by the doubling back of ends 33 are anchored to the O-ring 35 of clamp 34 by cooperation of an annular T-plate 36 and a cap 37 drawn tightly into communication therewith by a cap screw 38. The tapes 30 are each unsecured to the junctures 24 throughout portions 39 extending from point 40 on the periphery of the envelope 20. The locus of all points 40 in this instance substantially forms a circle, although in some instances, it need not necessarily form a circle.

While the junctures 24 are usually provided by turning into cooperating abutment the edges of gores 23 and heat-sealing them together, and the tapes 30 are usually heat-sealed over the junctures, this is not necessarily so and the tapes could be adhesively secured to the junctures, the gores could be otherwise secured, etc., to provide the substantially gas-proof envelope of the balloon.

Figure 3:
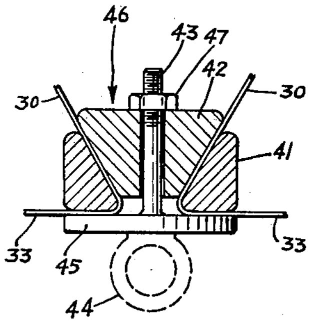
Figure 3 is a view similar to Figure 2 but showing a vertical sectional view through an inverted conical apex clamp.

The apex clamp 46 shown in Figure 3 comprises a conical annular clamp member 41 around which the turned ends 33 of the tapes 30 may be positioned, the conical clamp member 41 cooperating with a frusto-conical male member 42 having a central aperture through which the shank 43 of an eye-bolt 44 is positioned. The eye-bolt 43 is provided with an integral cap 45 which abuts snugly against the turned ends 33 of the tapes 30 as shown and the drawing up of nut 47 on the threaded end of shank 43 serves securely to engage the conical outer surface of male member 42 with the conical inner surface of clamp 41 to tightly position the tapes as shown in Figure 3. The eye of the bolt 44 may be used to attach tie down harness, etc.

Figures 4, 5:
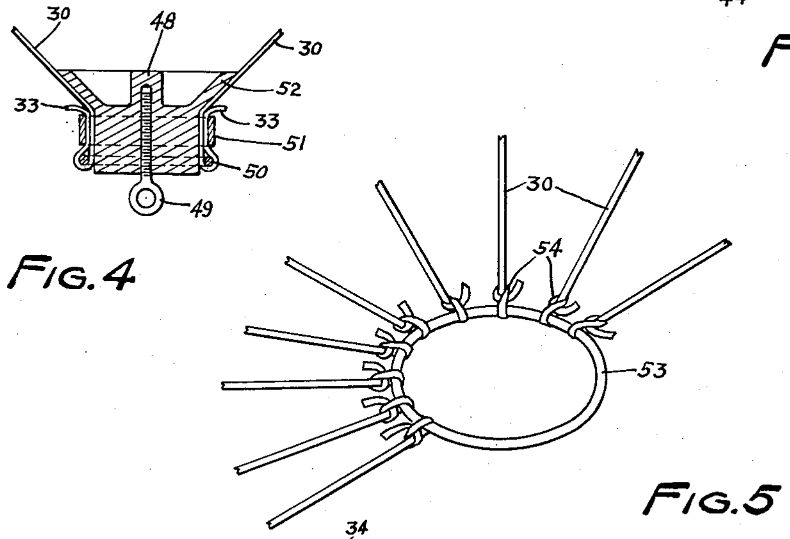
Figure 4 is a view similar to Figure 3 but showing another modified form of apex clamp in inverted position.
Figure 5 is a perspective view of an apex ring utilizable in place of any one of the apex clamps of Figures 1–4.

In the form of apex clamp shown in Figure 4, there is provided a core 48 having an eye-screw 49 affixed thereto. A cooperating hoop 50 is provided about which the ends 33 of tape 30 is doubled, the core then positioned so that its annular shoulder is interior of the hoop 50 and a clamp 51 is positioned between the hoop 50 and the flared end 52 of the core and drawn tightly to frictionally engage the tape 30 and double end 33 against the shoulder of the core 48.

Figure 2:
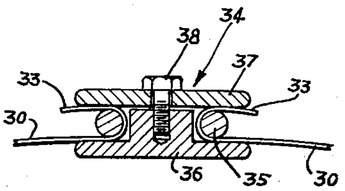
Figure 2 is an enlarged vertical sectional view through the apex clamp of Figure 1.

In Figure 5, the apex clamp has been replaced by an apex hoop or ring 53 to which the ends of the tapes 30 are tied, forming knots 54, instead of being doubled back as when the apex clamps of Figures 2–4 are used. Any suitable knot may be used to securely tie the ends of the tapes 30 to the ring 53.

Figure 6:
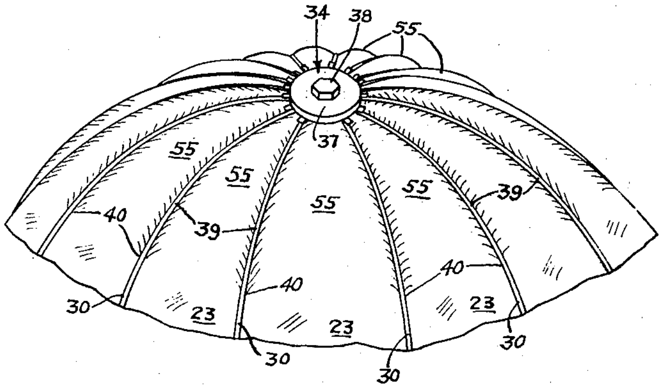
Figure 6 is a perspective view of the apex end of the balloon.

Regardless of whether the clamps of Figures 3 and 4, or the ring of Figure 5 is used, as shown best in Figures 6 and 7, the tapes 30 are to such a length throughout their free portion extending from point 40 as to cause the portions 55 of the gores 23 adjacent the apex of the balloon to bulge as shown in Figure 6 when the balloon is inflated. This is accomplished by providing these unsecured portions with an extension less than the normally inflated extension of the junctures of adjacent gores 23. In other words the tapes 30, were deliberately shortened throughout the portion unattached to the balloon envelope in order to provide an excess of slack balloon material at this point. The clamping arrangements utilized or rings make it possible to adjust the tapes individually to precise desired lengths.

By shortening the tapes at the apex end, excessive stressing of the balloon film or envelope at the apex is avoided from the gas pressure inside. Thus, the tapes are shortened, resulting in bulges 55 between the tapes which allows the use of much greater gas pressures or lighter balloon films or a combination of the two.

Figure 8:
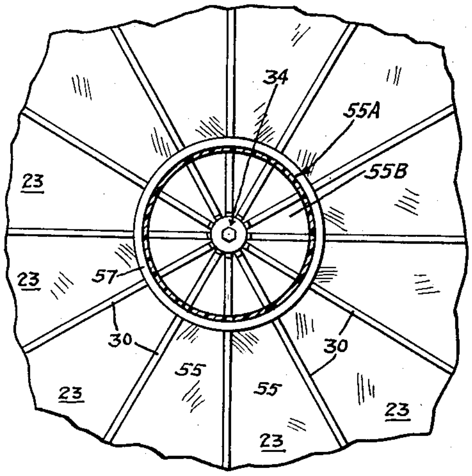
Figure 8 is a top plan view of an apex construction utilizing an apex duct with the duct shown in horizontal section.
Figure 9:
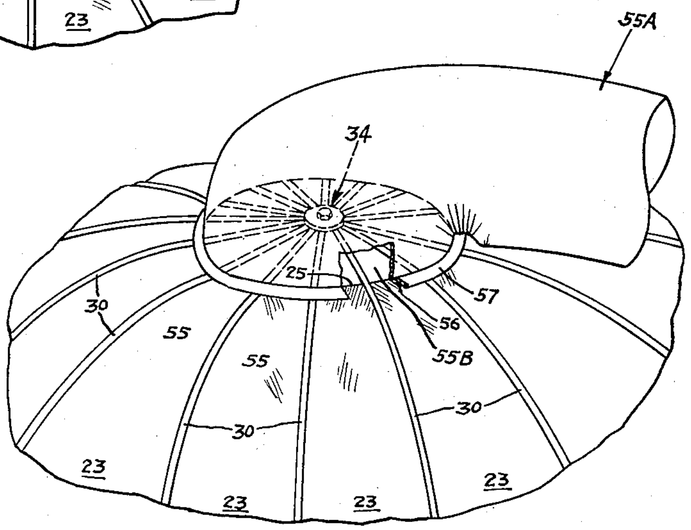
Figure 9 is a perspective view of the construction of Figure 8.

In Figures 8 and 9, there is shown an apex construction in which an apex inflation duct is utilized. In this construction, the tapes 30 are again provided with unsecured portions; the gores 23 terminate at 25 as explained with reference to Figure 7; and the ends of the tapes are secured to a clamp as illustrated by clamp 34 as shown in Figures 1 and 2. In this instance, however, the cap 27 is not provided so that there is a central apex aperture 55B intersected by the tapes 30. A tubular apex duct 55A having a flanged edge 56 is positioned to enclose this central aperture 55B and is sealed to the gores 23 and tapes 30 throughout its flanged edge 56, by heat-sealing or other suitable means and, a reinforcing tape 57 (or tapes) is securely positioned thereover and sealed to the envelope, gores and flanged edge to provide a gas-proof closure. Tapes 30 are sealed to the envelope at that point to provide a gas proof closure.

Figure 12:
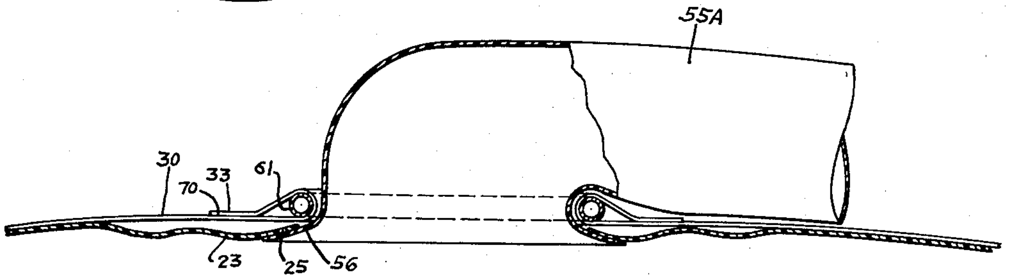
Figure 12 is a view of another modified apex construction utilizing an appendix duct.

In flight, or during inflation, the remainder of the tubular duct 55A rests upon the apex of the balloon envelope as shown in Figure 9, may or may not be sealed thereto, and serves to allow inflation of the balloon at the apex. Duct 55A usually extends a considerable distance down the balloon envelope but, for clarity, is shown in Figures 9 and 12 in truncated form. The end of the duct is usually closed.

Before the flanged edge 56 has been sealed to the tapes 30 and gores 23, the tapes 30 have been shortened and positioned in clamp 34 in shortened condition so that gores 23 are distorted, and 55 provided, as previously described.

Figure 10:
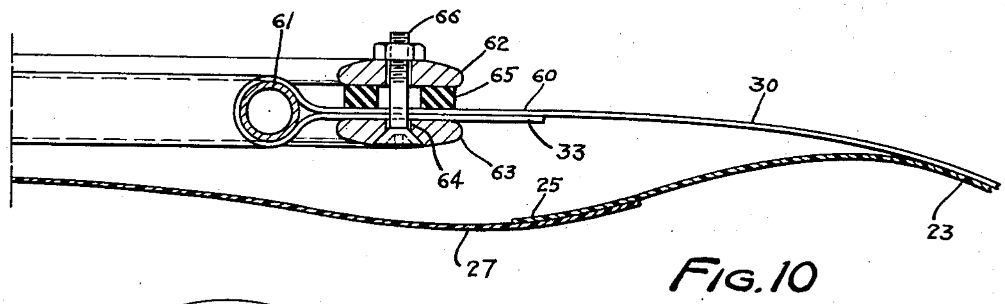
Figure 10 is a fragmentary vertical sectional view of a modified form of apex construction and illustrating an apex cap.
Figure 11:
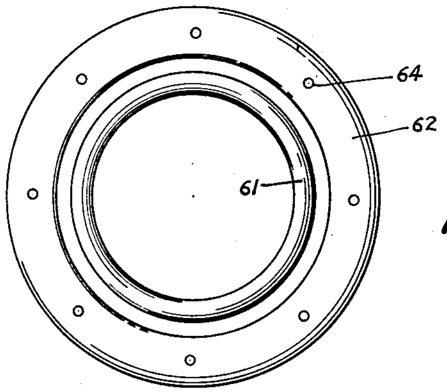
Figure 11 is a top plan view of the apex ring and hoop utilized in Figure 10.

In Figures 10 and 11 is shown another type of apex construction which may be used with or without an inflation duct 55A. In this form, the doubled back ends 33 of tapes 30 overlie the body of the tape at 60 after having been passed around a hoop 61. A cooperating pair of flat rings 62 and 63, provided with a series of apertures 64, is positioned, one to underlie the tapes 30 and one to overlie the tapes 30, after the tapes are shortened and adjusted as desired. Between one of the rings and the tapes, in this instance between ring 62 and tape 30, is then positioned a resilient gasket 65, and the whole assemblage is tightly secured together by machine screws 66.

As shown in Figure 10, the cap 27 is heat-sealed to the ends 25 of the gores 23. However, when the apex duct 55A is being used, the ends 25 of gores 23 are sealed to the flange 56 as shown with reference to Figures 8 and 9 or 12 and 13 and the cap 27 is omitted.

Figure 13:
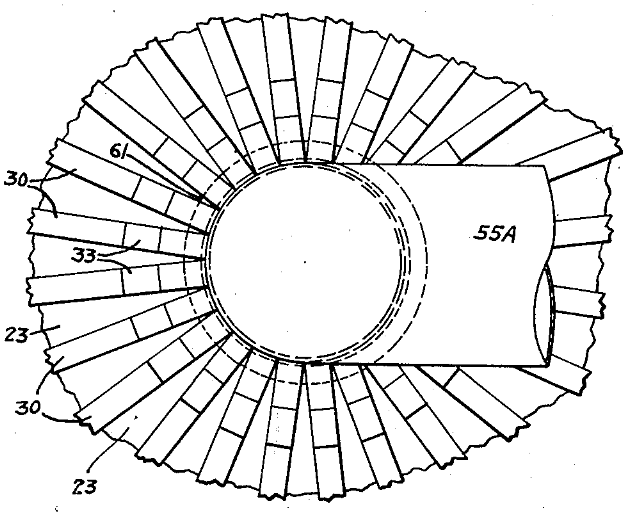
Figure 13 is a fragmentary top plan view of the modification of Figure 12.

In Figures 12 and 13, there is shown another form of apex construction in which a ring apex tape collector is utilized in cooperation with an apex duct. In this construction, the collector comprises merely an aluminum hoop 61 about which the ends 33 of tapes 30 are doubled back, adjusted to position, and sealed at 70. The flange 56 of the duct 55A is sealed to the edges of gores 23 as previously described. As shown in this construction, it is preferable, but not necessary that the inside circumference of the hoop is just equal to the number of load tapes used times the width of the tapes, thus providing a substantially complete coverage for the hoop without the crowding of tapes. However, it is to be understood that a larger or smaller hoop can be used.

Likewise with this modification, the appendix 55A may be omitted and the cap 27 secured to the ends 25 of the gores 23 if desired.

Figure 14:
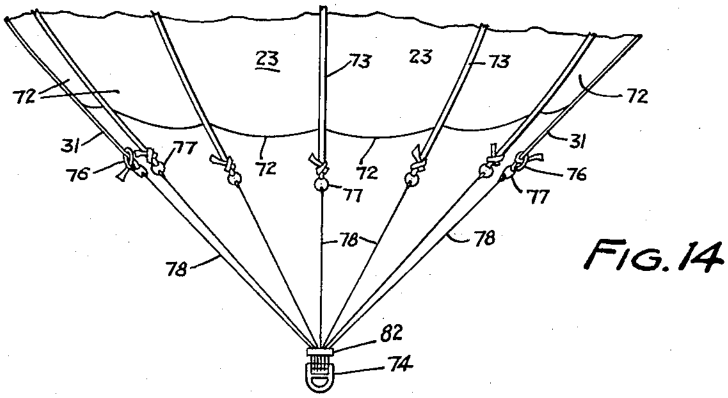
Figure 14 is a fragmentary elevational view of a balloon appendix constructed acording to the instant invention.
Figure 15:
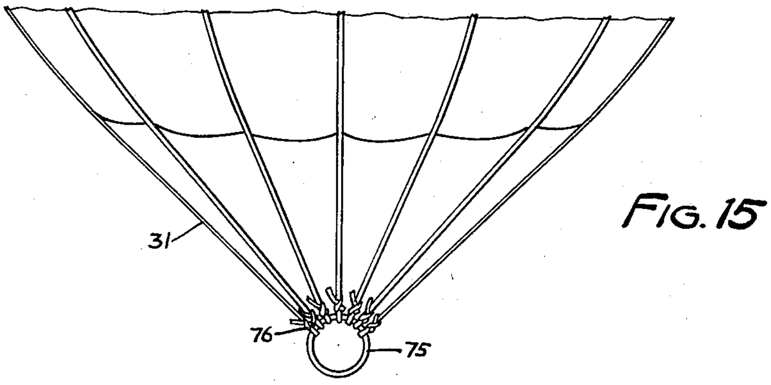
Figure 15 is a view similar to Figure 14 but showing a modified form of construction.

In Figures 14 and 15 is shown an appendix construction which utilizes the present invention. In this construction, the portions 73 of the tapes 30 are unsecured to the balloon envelope similarly to the unsecured portions 39 at the apex of the envelope and are shortened to have an extension less than the normal or inflated extension of the juncture of adjacent gores 23 so that each one of the gores adjacent the appendix is provided with an excess of slack envelope material, or bulged at 72.

In Figure 14 the extensions 31 are knotted at 76 to rings 77 to which are secured cables 78. Each cable 78 extends from one tape extension 31 to an opposite tape extension 31 so that it forms a saddle for D-ring 74. The cables are gathered together by a keeper 82 and retained in position as shown.

In Figure 15 the appendix construction is such that the extensions 31 are knotted at 76 directly to the load ring 75.

Figure 16:
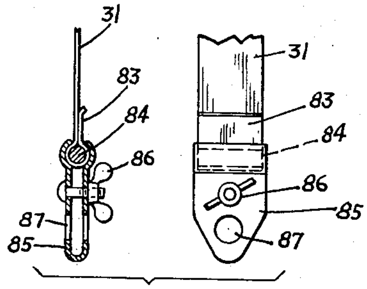
Figure 16 is a fragmentary view showing in vertical section an elevation, a modified clamp for an appendix load line.
Figure 17:
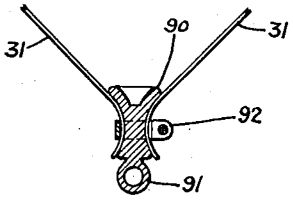
Figure 17 is a vertical sectional view showing another modified clamp for an appendix load line.

In Figures 16 and 17 two additional different types of appendix harness arrangements are shown. In Figure 16 the extensions 31 of tapes 33 are provided with doubled back portions 83 adjustably positioned around a bar or keeper 84 and a supporting U-clip 85 is secured thereto by a wing-nut 86. U-clip 85 is provided with an aperture 87 which may be secured to a load by a conventional means.

If desired, the rods 84 may comprise an annular ring and the individual U-clips 85 may be secured to the ring one for each tape 30.

In Figure 17 there is shown a hyperbolic clip 90 having an eye-ring 91 and a clamp 92 so that the extensions 31 of the tapes 30 may be adjustably positioned along the concave surface of the hyperbolic clip as shown and securely drawn into communication therewith by clamp 92.

Thus, it will be seen that this invention provides a reinforcing or confining balloon structure in which reinforcing members are shortened to distort the natural or inflated shape or configuration of the balloon envelope adjacent a terminal to provide slack material and relieve stress. The tapes may be utilized with appendix supporting means, apex supporting means or an apex duct. In the event that the balloon is an open appendix balloon, as illustrated (although this invention is by no means confined solely to open appendix balloons) the reinforcing tapes, unsecured to the balloon envelope, adjacent the appendix end, are shortened so that their extension is less than a prolongation of the balloon envelope surface.

It has been found preferable to use the reinforced tapes of our application Serial No. 489,374, filed February 21, 1955, now Patent No. 2,858,090, as the reinforcing tapes, and to use reinforced balloon seals between adjacent gores as described in that application. However, other tapes may be used without departing from the spirit and scope hereof, as long as they are substantially inextensible with relation to the balloon envelope.

Further, it has been found preferable to use a balloon envelope of a substantially inextensible thermoplastic gas impervious material such as polyethylene and to make all junctures by heat-sealing. However, other envelope materials and seals may be used without departing from the spirit and scope of this invention.

As many widely differing embodiments of this invention may be made without departing from the spirit and scope hereof, it is to be understood that the specific embodiments described are given by way of example only and the invention is limited only by the terms of the appended claims.

What is claimed is:

1. A balloon comprising an inflatable envelope, a plurality of elongated reinforcing tapes secured throughout a portion of their extension to said inflatable envelope in generally parallel relationship and co-extensive therewith, said reinforcing members each being unsecured to said envelope throughout a portion adjacent one end thereof, means adjustably securing the ends of said members together, said unsecured portions of said reinforcing members each having an extension less than the extension of said envelope so as to provide an excess of envelope material between said unsecured portions when said envelope is in inflated condition.

2. A balloon comprising in combination a plurality of gores of flexible gas-proof material joined together at adjacent edges to form junctures and extending in a direction from the apex to the appendix ends of the balloon, a plurality of reinforcing members extending from one of said ends of the balloon toward a median line therebetween, said reinforcing members comprising elongated tapes secured to said balloon envelope, at least some of said tapes overlying said junctures, said tapes being unsecured to said envelope throughout a portion adjacent said apex end, said tapes being shortened and secured together to distort the balloon envelope from its ordinary inflated configuration to provide a plurality of bulges therein adjacent said apex end.

3. A balloon comprising an inflatable envelope and having terminal portions, a plurality of elongated reinforcing members secured to said inflatable envelope in generally parallel relationship throughout at least a portion of their extension, means securing respective ends of said members together, the extensions of said members being shortened only adjacent one of said terminal portions so as to provide an excess of envelope material therebetween when said envelope is in inflated condition.

4. The structure of claim 3 further characterized in that the ends of said members are secured to a hoop and an inflation member positioned interior of said hoop and secured to the balloon envelope.

5. The structure of claim 3 further characterized by an inflation member secured to said balloon envelope and said members.

6. The structure of claim 3 further characterized in that said members are adjacent the apex end of the balloon, an apex inflation duct positioned at the apex of the balloon, and said tapes being secured to a ring means positioned exterior of the periphery of said inflation duct.

7. A balloon comprising an inflatable envelope, a plurality of elongated reinforcing members secured to said inflatable envelope in generally parallel relationship, said reinforcing members each being unsecured to said envelope throughout a portion adjacent one end thereof, means securing the ends of said members together, the extensions of said reinforcing members being shortened to provide an excess of envelope material therebetween adjacent said terminal end when said envelope is in inflated condition.

8. A balloon comprising an inflatable envelope, a plurality of elongated reinforcing members secured to said inflatable envelope in generally parallel relationship throughout at least a portion of their extension, said members each being secured to the balloon at one end and to a hoop means at the other end, said hoop means being positioned at the apex of the balloon, and an inflation member positioned interior of said hoop means and secured to the balloon apex.

9. A balloon comprising in combination a plurality of gores of flexible gas-proof material joined together at adjacent edges to form junctures and extending in a direction from the apex terminal portion to the appendix terminal portion of the balloon, a plurality of reinforcing members extending from one of said ends of the balloon toward a median line therebetween, said reinforcing members comprising elongated tapes secured to said balloon envelope, at least some of said tapes overlying said junctures, said tapes being unsecured to said envelope throughout a portion adjacent one of said terminal portions, said tapes being shortened and secured together to distort the balloon envelope from its ordinary inflated configuration to provide a plurality of bulges therein, said tapes being adjacent the apex end of the balloon, an apex inflation duct positioned at the apex of the balloon, and said tapes being secured to a means positioned exterior of the periphery of said inflation duct.

References Cited in the file of this patent

UNITED STATES PATENTS

| | | |
|---|---|---|
| 2,598,696 | Huch | June 3, 1952 |
| 2,602,609 | Huch et al. | July 8, 1952 |
| 2,679,224 | Sturtevant | May 25, 1954 |
| 2,728,540 | Ebneter | Dec. 27, 1955 |

FOREIGN PATENTS

| | | |
|---|---|---|
| 4,104 | Great Britain | of 1878 |